US012707332B2

(12) United States Patent
Xi et al.

(10) Patent No.: US 12,707,332 B2
(45) Date of Patent: Aug. 11, 2026

(54) PATH SELECTION STRATEGY UTILIZING TYPE OF SERVICE (TOS) IN SOFTWARE-DEFINED WIDE AREA NETWORK (SD-WAN)

(71) Applicant: Fortinet, Inc., Sunnyvale, CA (US)

(72) Inventors: Wang Xi, Vancouver (CA); Shangwei Duan, Vancouver (CA)

(73) Assignee: Fortinet, Inc., Sunnyvale, CA (US)

(*) Notice: Subject to any disclaimer, the term of this patent is extended or adjusted under 35 U.S.C. 154(b) by 294 days.

(21) Appl. No.: 18/401,553

(22) Filed: Dec. 31, 2023

(65) Prior Publication Data

US 2025/0220509 A1 Jul. 3, 2025

(51) Int. Cl.

*H04W 28/08* (2023.01)
*H04W 84/12* (2009.01)

(52) U.S. Cl.

CPC ........ *H04W 28/0958* (2020.05); *H04W 84/12* (2013.01)

(58) Field of Classification Search

CPC .. H04W 28/0958; H04W 84/12; H04L 45/124
See application file for complete search history.

(56) References Cited

U.S. PATENT DOCUMENTS

| | | | | |
|---|---|---|---|---|
| 8,111,649 | B1 * | 2/2012 | Agarwall | H04L 12/00 370/328 |
| 2022/0103466 | A1 * | 3/2022 | Cai | H04L 45/22 |
| 2024/0297708 | A1 * | 9/2024 | Szigeti | H04B 7/18513 |
| 2025/0168224 | A1 * | 5/2025 | Sun | H04L 45/28 |

* cited by examiner

*Primary Examiner* — Austin J Moreau
(74) *Attorney, Agent, or Firm* — Law Office of Dorian Cartwright; Dorian Cartwright

(57) ABSTRACT

An SD-WAN route is selected based on the TOS parameters matching real-time SD-WAN link quality requirement by matching jitter, latency and/or packet loss requirements of TOS parameters to highest ranking links over a route. The TOS parameters for a specific application can be parsed from data traffic and matched to optimal SD-WAN routes. The data traffic of the first data packet and subsequent data packets of the first session is output to the selected SD-WAN link.

8 Claims, 6 Drawing Sheets

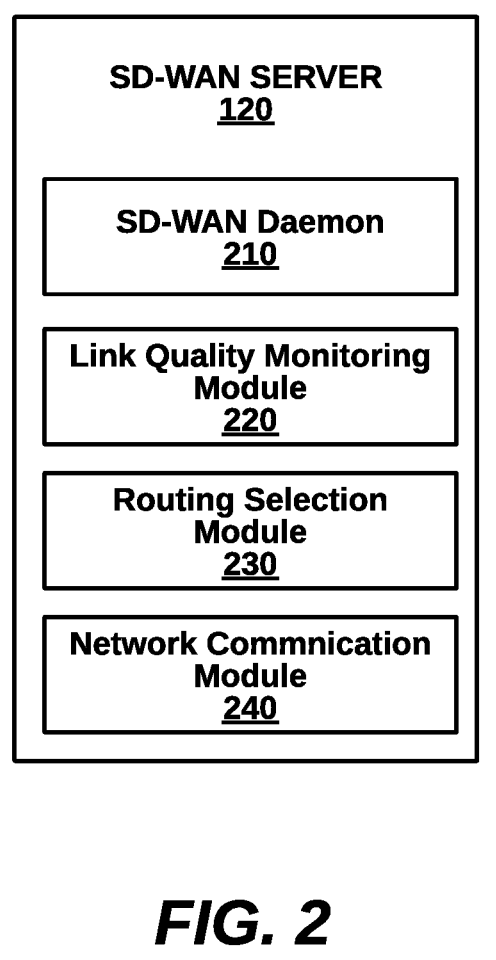

SD-WAN SERVER
120

SD-WAN Daemon
210

Link Quality Monitoring Module
220

Routing Selection Module
230

Network Commnication Module
240

FIG. 2

PATH SELECTION STRATEGY UTILIZING TYPE OF SERVICE (TOS) IN SOFTWARE-DEFINED WIDE AREA NETWORK (SD-WAN)

FIELD OF THE INVENTION

The invention relates generally to computer networks, and more specifically, for path selection on a per-application basis during loading balancing in Software-Defined Wide Area Network (SD-WAN), utilizing Type of Service (TOS).

BACKGROUND

The enhancement of SD-WANs has revolutionized network management, offering enhanced control and optimization of traffic flows.

However, the existing routing strategies based on SD-WAN rules pose two critical challenges: (1) Complexity of SD-WAN Rule Configuration and (2) Expertise and Precision in Rule Definition. First, current SD-WAN implementations necessitate the creation of specific rules for each application, using metrics such as packet loss, latency, and jitter. For example, VOIP traffic must be routed based on the lowest jitter, while video data should prioritize minimal packet loss. With a myriad of applications in real-world scenarios, this approach demands an overwhelming number of SD-WAN rules. Managing and configuring thousands of rules becomes a formidable task for network administrators, leading to operational inefficiencies. Second, and with respect to Expertise and Precision in Rule Definition, SD-WAN rule configuration largely relies on network administrators' experiences and expertise. Even with skilled administrators, accurately defining a rule that aligns each application with the desired metric can be challenging. The current SD-WAN rule often falls short in guaranteeing the desired network performance, leading to suboptimal routing decisions and impacting Quality of Service (QOS).

What is needed is a robust technique for path selection, during loading balancing in SD-WAN, utilizing TOS. Furthermore, the selection can be based on a specific application traffic.

SUMMARY

To meet the above-described needs, methods, computer program products, and systems for per-application path selection, during loading balancing in SD-WAN, utilizing TOS.

In one embodiment, a TOS option is enabled for sessions of SD-WAN data traffic over ports of a network interface configured for load balancing of the SD-WAN data traffic. An SD-WAN link quality of multiple links (link types include Internet, LTE, mobile data, cell data, ADSL, Wi-Fi, and Ethernet). Each link associated with a different Internet Service Provider (ISP) to determine SD-WAN routes in real-time, wherein the SD-WAN link quality comprises jitter, latency, bandwidth and packet loss.

In another embodiment, the TOS parameters are extracted from a header of a first data packet of a first session of a plurality of sessions the SD-WAN data traffic. An SD-WAN link quality requirement (or rule) is determined for the first session based on TOS parameters of an application generating the first session. For example, the SD-WAN link quality requirement can be derived from at least one of a jitter requirement, a latency requirement, a bandwidth requirement, and a packet loss requirement from the TOS parameters of the application.

In still another embodiment, an SD-WAN route is selected based on the TOS parameters matching real-time SD-WAN link quality requirement by matching jitter, latency and/or packet loss requirements of TOS parameters to highest ranking links over a route. The data traffic of the first data packet and subsequent data packets of the first session is output to the selected SD-WAN link.

Advantageously, computer networks are improved with better performance, and computer devices are improved when running applications over SD-WAN.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2 is a more detailed block diagram illustrating a SD-WAN server of the system of FIG. 1, according to one embodiment.

DETAILED DESCRIPTION

Methods, computer program products, and systems for per-application path selection, during loading balancing in SD-WAN, utilizing TOS. The following disclosure is limited only for the purpose of conciseness, as one of ordinary skill in the art will recognize additional embodiments given the ones described herein. For example, the principles described herein can apply to protocols other than SD-WAN.

Figure 3:
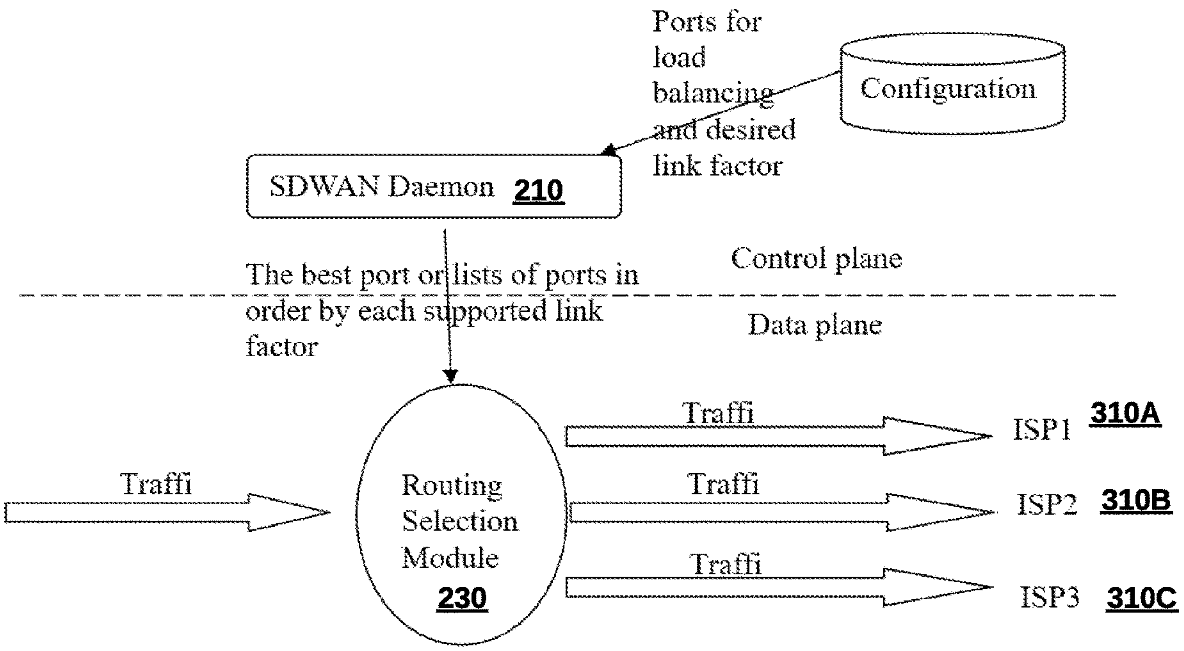
FIG. 3 is a schematic diagram illustrating how components of the system interoperate, according to one embodiment.

I. Systems for TOS-Based Per-Application Path Selection (FIGS. 1-3)

Figure 1:
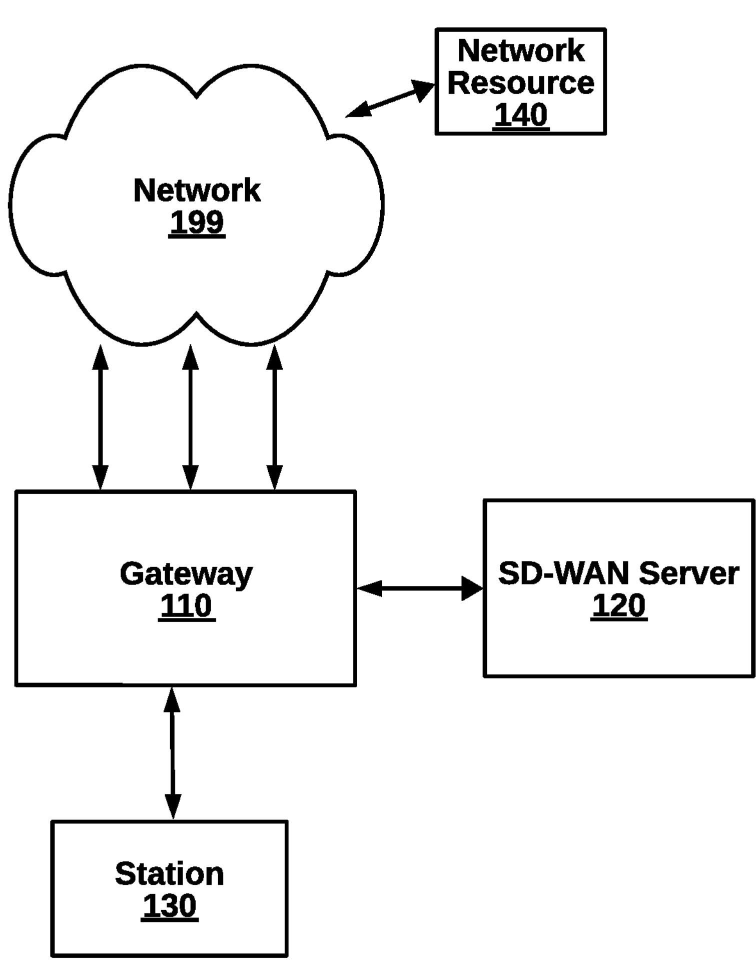
FIG. 1 is a high-level block diagram illustrating aspects of a system coordinating for per-application path selection, during loading balancing, utilizing TOS in SD-WAN, according to some embodiments.
Figure 6:
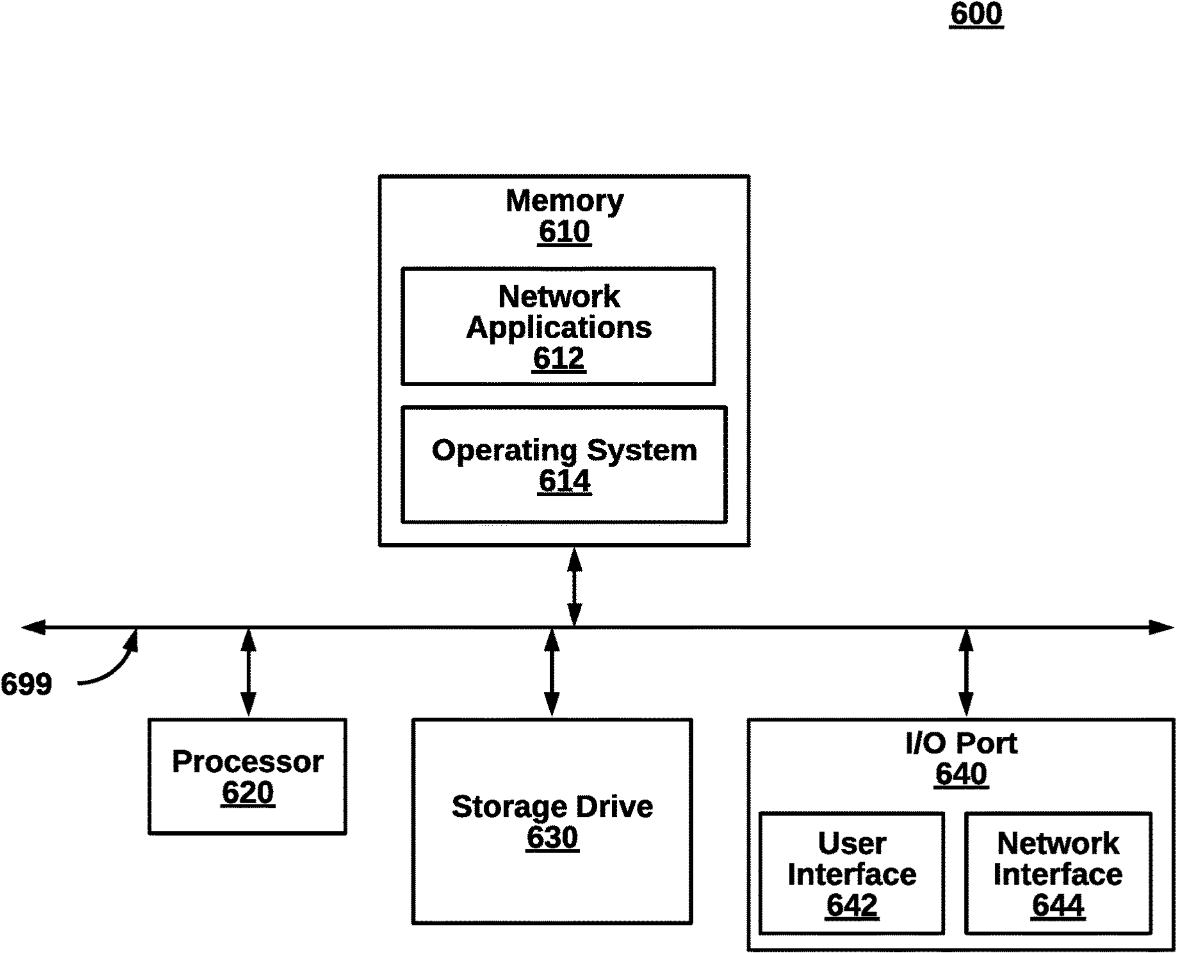
FIG. 6 is a block diagram illustrating an example computing device for the system of FIG. 1, according to one embodiment.

FIG. 1 is a high-level block diagrams illustrating a system 100 for per-application path selection, during loading balancing in SD-WAN, utilizing TOS, according to an embodiment. The system 100 includes an enterprise network with a Wi-Fi gateway 110, an SD-WAN server 120, and a station 130. An ISP 1 140A, an ISP 2 140B, and an ISP 3 140C are outside of the enterprise network. Destinations for traffic may also exist outside of the enterprise network. Other embodiments of the system 100 can include additional components that are not shown in FIG. 1, such as routers, switches, network gateways, and firewalls, as well as additional access points and stations are also possible. For example, the system 100 of FIG. 1 shows one station and three access points, however, other examples have hundreds of stations connected to access points distributed over different LANs. The components of system 100 can be implemented in hardware, software, or a combination of both. An example implementation is shown in FIG. 6.

In one embodiment, the components of the system 100 are coupled in communication over a private network connected to a public network, such as the Internet. In another embodiment, system 100 is an isolated, private network, or alternatively, a set of geographically dispersed LANs. The components can be connected to the data communication system 199 via hard wire (e.g., Wi-Fi gateway 110, SD-WAN server and ISP 1 140A, ISP 2 140B, and ISP 140C). The components can also be connected via wireless networking (e.g., station 130). The data communication network 199 can be composed of any combination of hybrid networks, such as an SD-WAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPV4 or Ipv6 address spaces.

One embodiment of the system 100 in operation is described in the following non-limiting example:

The proposed approach leverages Type of Service (TOS) attributes for intelligent and adaptable traffic routing. It introduces a novel TOS-based SD-WAN rule, which generates multiple queues based on the various TOS parameters defined in RFC 4594, while the number of queues is decided by the number of link quality factors like jitter, packet loss, latency and bandwidth, which is much fewer than the number of TOS parameters. Each queue comprises potential SDWAN priority members, and their order is determined by the TOS metrics. For example, SDWAN member 1, despite having the highest latency, boasts the maximum bandwidth. Consequently, it occupies the end position in queue 1, representing TOS 1000 (minimize delay), while taking the prime spot in queue 2, denoting TOS 0100 (maximize throughput). When user IP traffic arrives, the TOS value in its IP header is leveraged to identify the corresponding queue within the SD-WAN rule. This enables the selection of the preferred SD-WAN member link from the respective queue.

A single SD-WAN rule can accommodate multiple application categories, each identified by specific TOS values. This results in a notably simplified configuration process. Furthermore, as the TOS values are inherently tied to the applications themselves, administrators are relieved of the need to explicitly assign applications to particular queues. This not only eliminates the risk of network administrator mistakes but also leads to more accurate traffic routing. As shown in the FIG. 3, a network system is consist of control plane and data plane. The traffic distribution is done in routing selection module 220 in the data plane, where is a pre-defined route for each ISP 140A-C. These routes have a list of output interfaces in order to form RPDB (routing policy database) routes. When an initial session packet comes, the routing selection module 220 can determine its outgoing ISP based on the pre-defined routing policy and the order of output interfaces. The ISPs can have different types of links, such as LTE, Wi-Fi, Ethernet, and DSL. If this packet can pass the related security and policy check, the session which is identified by IP 5-tuple will be created. All traffic thereafter over this session will be directed to the same ISP using the same route. One embodiment updates routes during a session. Another embodiment bundles sessions into groups for policy application.

The TOS-based, load balancing utilizes the same session establishment algorithm with the pre-defined TOS in the IP header to select ISP based on the specified link factor. As depicted in the FIG. 3, the best port for each supported link factor or a list of ports in order based on each supported link factor is generated in the control plane by the SD-WAN daemon 210. Initially, a group of ports are configured to support load balancing and the desired link factor can be set for specified TOS or we can classify the traffic based on the meaning of each bit defined in TOS as per RFC 1349. The daemon orders the ports according to the real-time data collected by health check for a specific link factor or for all supported link factors, and sets this to routing selection module. And then, when initial traffic arrives and comes into the routing selection process, the routing selection module reads the TOS bits in the IP header and then determines the matched link factor based on RFC 1349 or especially configured by configuration. It could be configured based on the administrator's experiences or hard-coded according the types and models of the network devices. For instance, the TOS value 1111 could be assigned to minimize monetary cost preferred.

The order of ports will be written into the routing selection module once they are figured out. Next, it is applied to the current routing policy selection algorithm to select an ISP for every new session during an update period. All traffic will be forward based on their own sessions. When a period expires, the daemon will collect new data for each link factor from interfaces to each ISP, then figures out the order of ports by the function below, taking latency for example: if (port1 latency<port2 latency AND port2 before port1 in order), then exchange the order of port1 and port2.

The period is related to the accuracy of the ratio of this load balancing. In practice, this period can be as short as the period of health check which can be configured by the administrator. In most cases by default, the period is 500 ms.

With the traffic continuing to be forwarded, some sessions with same TOS but different uses may be established on the same port, like voice call service traffic and game stream service traffic which are both latency sensitive. At this time, the priority value written into the routing selection module will be considered, current per port Qos algorithm guarantees these related sessions will be queued by their priorities. Therefore, it becomes supporting QoS across ports and within one single port at the same time.

The following Pseudo code is one example an order of ports update process is below:

```
For every link factor {
  Compare the link factor values between different ports {
    If port1 before port2 in order AND the port2's value is better
      Exchange the order of port1 and port2
  }
}
The routing policy selection process is below:
While (traffic) {
  For every initial session {
    Find the TOS for the session
    Match a route policy
    Find the related order of ports based its TOS
    For ordered ports {
      If security check passed AND network reachable
        Egress via the port's send queue
    }
  }
}
```

In another embodiment of the system 100, the SD-WAN server 120 is integrated as an application within the gateway 110.

The station 130 connects to nearby access points over wireless channels for uploading and downloading data from the data communication network. From time-to-time, the station 130 roams from one access point to a different access point, often due to a better RSSI signal being available. However, the gateway 110 is a common network device as the station 130 roams across the same LAN. A most optimal SD-WAN route to ISPs may remain constant as the station 130 roams, as preferably new sessions or new application actions trigger SD-WAN selection.

FIG. 2 is a more detailed block diagram illustrating the SD-WAN server 120 of the system of FIG. 1, according to one embodiment. The Wi-Fi gateway 110 includes an SD-WAN Daemon 210, a link quality monitoring module 220, a routing selection module 230 and a network communication module 240. The components can be implemented in hardware, software, or a combination of both.

The SD-WAN daemon 210 enabling a TOS option for sessions of SD-WAN data traffic over ports of a network interface configured for load balancing of the SD-WAN data traffic.

The link quality monitoring module 220 monitors SD-WAN link quality of multiple links [Internet, LTE, mobile data, cell data, ADSL, Wi-Fi, Ethernet], each link associated with a different ISP to determine SD-WAN routes in real-time, wherein the SD-WAN link quality comprises jitter, latency, bandwidth and packet loss.

The routing selection module 220 extracts TOS parameters from a header of a first data packet of a first session of a plurality of sessions the SD-WAN data traffic. An SD-WAN link quality requirement is determined for the first session based on TOS parameters of an application generating the first session by deriving at least one of a jitter requirement, a latency requirement, a bandwidth requirement, and a packet loss requirement from the TOS parameters of the application. An SD-WAN route based is selected on the TOS parameters matching real-time SDWAN link quality requirement by matching jitter, latency and/or packet loss requirements of TOS parameters to highest ranking links over a route.

The network communication module 230 outputs the data traffic of the first data packet and subsequent data packets of the first session to the selected SDWAN route.

II. Methods for Per-Application TOS-Based Path Selection (FIGS. 4-5)

Figure 4:
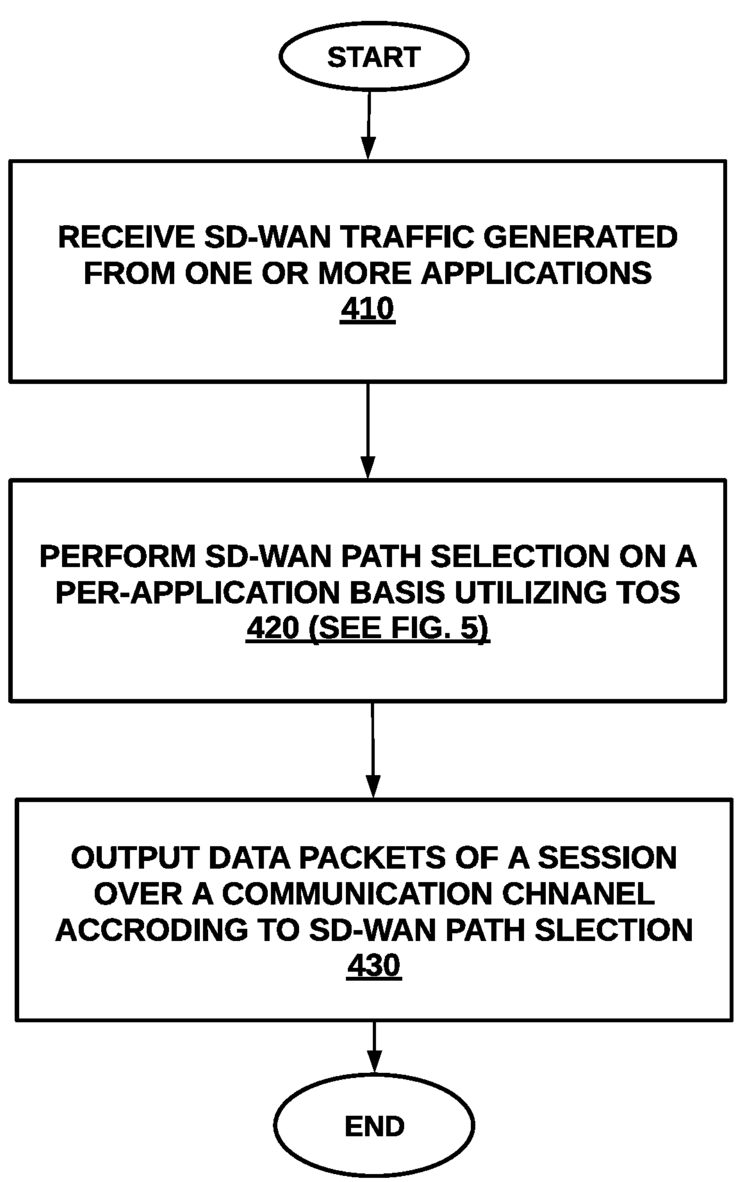
FIG. 4 is a high-level flow diagram illustrating a method for per-application load balancing in SD-WAN, according to an embodiment.
Figure 5:
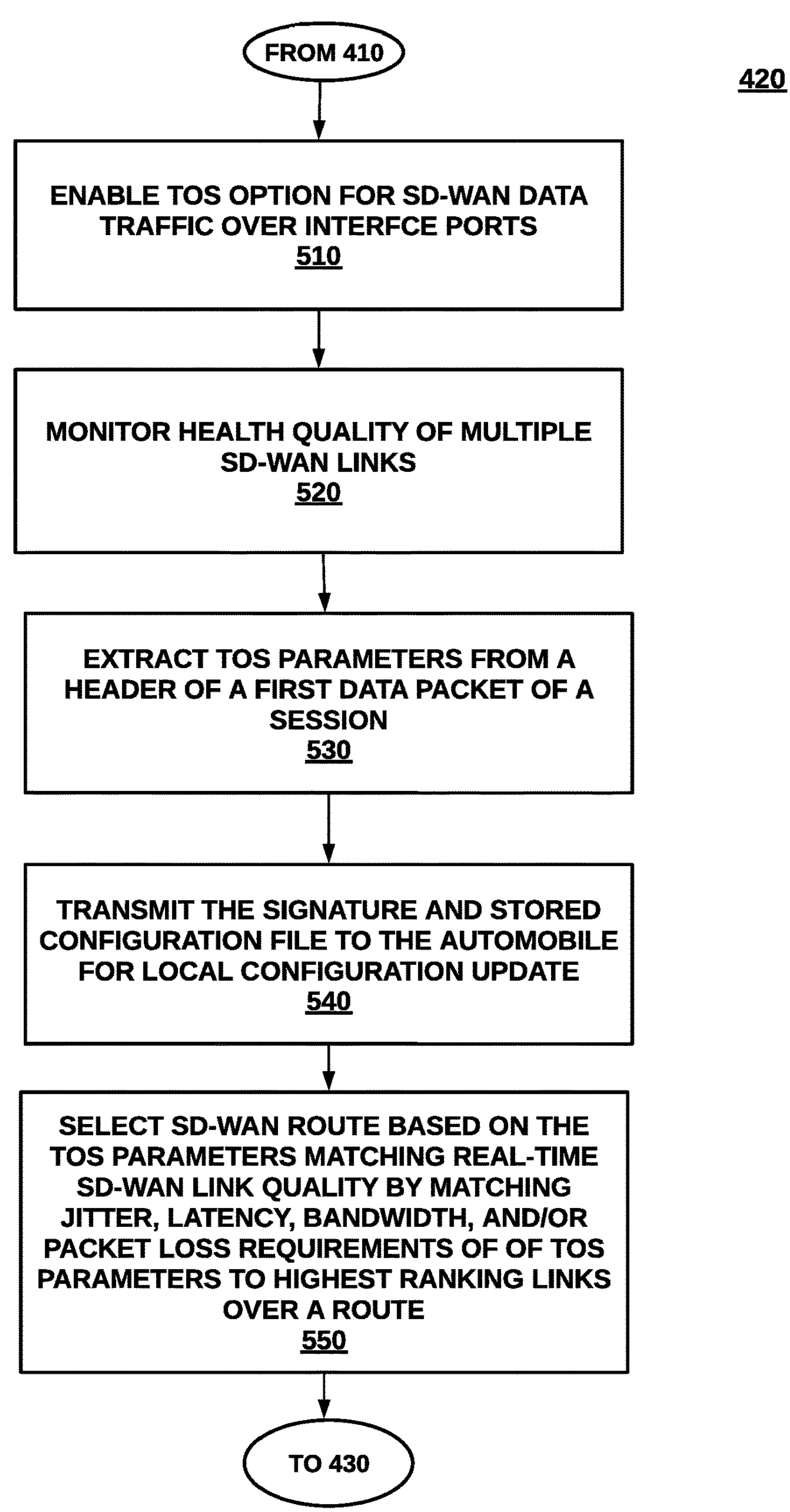
FIG. 5 is a more detailed flow diagram illustrating a step for per-application path selection, during loading balancing in SD-WAN, utilizing TOS, from the method of FIG. 4, according to one embodiment.

FIG. 4 is a high-level flow diagram of a method 400 for load balancing data traffic. The method 400 can be implemented by, for example, system 100 of FIG. 1. The specific grouping of functionalities and order of steps are a mere example as many other variations of method 400 are possible, within the spirit of the present disclosure. Other variations are possible for different implementations.

At step 410, one or more applications generate SD-WAN data traffic. For example, teleconferencing software, a network browser, or home alarm monitoring app is launched. Each application can have unique SD-WAN selections based on varying TOS parameters. In some embodiments, a new instance of a running application can generate a new session, and thus, an independent SD-WAN path selection for the same running application.

At step 420, SD-WAN path selection is performed on a per-application basis, during loading balancing, utilizing TOS, as described in more detail below in association with FIG. 5.

At step 430, the data traffic of the first data packet and subsequent data packets of the first session are output to the selected SD-WAN route over a communication channel corresponding to the links.

FIG. 5 is a more detailed flow diagram detailing the step 420 of per-application SD-WAN path selection, during loading balancing, utilizing TOS, according to an embodiment.

Specifically, at step 510, a TOS option is enabled for sessions of SD-WAN data traffic over ports of a network interface configured for load balancing of the SD-WAN data traffic.

At step 520, SD-WAN link quality of multiple links is monitored. The links can include Internet, LTE, mobile data, cell data, ADSL, Wi-Fi, Ethernet, for example. Each link can be associated with a different ISP to determine SD-WAN routes in real-time, as shown in FIG. 3. The SD-WAN link quality comprises jitter, latency, bandwidth and packet loss.

At step 530, TOS parameters are extracted from a header of a first data packet of a first session of a plurality of sessions the SD-WAN data traffic. Multiple sessions can be managed in parallel using a session table. In some cases, TOS parameters are rechecked during a session.

At step 540, an SD-WAN link quality requirement for the first session, based on TOS parameters of an application generating the first session, is determined by deriving at least one of a jitter requirement, a latency requirement, a bandwidth requirement, and a packet loss requirement from the TOS parameters of the application. For example, a table can be accessed for correlating applications to TOS requirements. These requirements can be input by programmers, network administrators, user experience settings, or the like. There can also be local SD-WAN rules for correlating based on enterprise policies.

At step 550, an SD-WAN route is selected based on the TOS parameters matching real-time SD-WAN link quality requirement by matching jitter, latency and/or packet loss requirements of TOS parameters to highest ranking links over a route. Some embodiments can update SD-WAN routes for a session, for example, based on changes in link quality after subsequent monitoring of the link. Other embodiments consider additional factors for link selection.

III. Computing Device for Per-Application TOS-Based Path Selection (FIG. 6)

FIG. 6 is a block diagram illustrating a computing device 600 for use in the system 100 of FIG. 1, according to one embodiment. The computing device 600 is a non-limiting example device for implementing each of the components of the system 100, including the Wi-Fi gateway 110, the SD-WAN sever 120, ISP 130A, ISP 130B, ISP 130C and the station 140. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase network appliance generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a Wi-Fi gateway on a data communication network, for per-application path selection during loading balancing in Software-Defined Wide Area Network (SD-WAN), utilizing Type of Service (TOS), the method comprising:

enabling a TOS option for sessions of SD-WAN data traffic over ports of a network interface configured for load balancing of the SD-WAN data traffic;

monitoring SD-WAN link quality of multiple links [Internet, LTE, mobile data, cell data, ADSL, Wi-Fi, Ethernet], each link associated with a different ISP to determine SD-WAN routes in real-time, wherein the SD-WAN link quality comprises jitter, latency, bandwidth and packet loss;

extracting TOS parameters from a header of a first data packet of a first session of a plurality of sessions the SD-WAN data traffic;

determining an SD-WAN link quality requirement for the first session based on TOS parameters of an application generating the first session by deriving at least one of a jitter requirement, a latency requirement, a bandwidth requirement, and a packet loss requirement from the TOS parameters of the application;

identifying, from the TOS parameters, a corresponding queue among a plurality of queues generated for different TOS parameters, each queue comprising an ordered list of candidate links ranked according to a respective link factor;

selecting an SD-WAN route based on the TOS parameters matching real-time SD-WAN link quality requirement by matching jitter, latency and/or packet loss requirements of TOS parameters to highest ranking links over a route, including selecting a preferred link from the corresponding queue based on the ordered list of candidate links; and outputting the data traffic of the first data packet and subsequent data packets of the first session to the selected SD-WAN route.

2. The method of claim 1, further comprising configuring rules associated with selecting links for sessions.

3. The method of claim 1, wherein the TOS parameters comprise a TOS field.

4. The method of claim 1, wherein the step of selecting the SD-WAN route further comprises overriding a first selected SD-WAN route if one of the links of the route are unreachable.

5. The method of claim 1, wherein the step of selecting the SD-WAN route further comprises overriding a first selected SD-WAN route if a security check of the route does not pass.

6. The method of claim 1, wherein SD-WAN links comprise one or more of Internet, LTE, mobile data, cell data, ADSL, Wi-Fi, and Ethernet.

7. A non-transitory computer-readable medium in a SD-WAN server on a data communication network, for per-application path selection during loading balancing in Software-Defined Wide Area Network (SD-WAN), utilizing Type of Service (TOS), the method comprising:

enabling a TOS option for sessions of SD-WAN data traffic over ports of a network interface configured for load balancing of the SD-WAN data traffic;

monitoring SD-WAN link quality of multiple links, each link associated with a different ISP to determine SD-WAN routes in real-time, wherein the SD-WAN link quality comprises jitter, latency, bandwidth and packet loss;

extracting TOS parameters from a header of a first data packet of a first session of a plurality of sessions the SD-WAN data traffic;

determining an SD-WAN link quality requirement for the first session based on TOS parameters of an application generating the first session by deriving at least one of a jitter requirement, a latency requirement, a bandwidth requirement, and a packet loss requirement from the TOS parameters of the application;

identifying, from the TOS parameters, a corresponding queue among a plurality of queues generated for different TOS parameters, each queue comprising an ordered list of candidate links ranked according to a respective link factor;

selecting an SD-WAN route based on the TOS parameters matching real-time SD-WAN link quality requirement by matching jitter, latency and/or packet loss requirements of TOS parameters to highest ranking links over a route; and outputting the data traffic of the first data packet and subsequent data packets of the first session to the selected SD-WAN route.

8. A Software-Defined Wide Area Network (SD-WAN) server on a data communication network, for per-application path selection during loading balancing in SD-WAN, utilizing Type of Service (TOS), the SD-WAN server comprising:

a processor;

a network interface communicatively coupled to the processor and to a data communication network; and a memory, communicatively coupled to the processor and storing instructions that are executable by the processor, and comprise:

a TOS module to enable a TOS option for sessions of SD-WAN data traffic over ports of a network interface configured for load balancing of the SD-WAN data traffic;

a link monitoring module to monitor SD-WAN link quality of multiple links, each link associated with a different ISP to determine SD-WAN routes in real-time, wherein the SD-WAN link quality comprises jitter, latency, bandwidth and packet loss;

the TOS module to extract TOS parameters from a header of a first data packet of a first session of a plurality of sessions the SD-WAN data traffic;

a selection module to determining an SD-WAN link quality requirement for the first session based on TOS parameters of an application generating the first session by deriving at least one of a jitter requirement, a latency requirement, a bandwidth requirement, and a packet loss requirement from the TOS parameters of the application, identify, from the TOS parameters, a corresponding queue among a plurality of queues generated for different TOS parameters, each queue comprising an ordered list of candidate links ranked according to a respective link factor, the selection module to select an SD-WAN route based on the TOS parameters matching real-time SD-WAN link quality requirement by matching jitter, latency and/or packet loss requirements of TOS parameters to highest ranking links over a route, the network interface to output the data traffic of the first data packet and subsequent data packets of the first session to the selected SD-WAN route.

* * * * *